US008328220B1

(12) United States Patent
Kern

(10) Patent No.: US 8,328,220 B1
(45) Date of Patent: Dec. 11, 2012

(54) WHEELCHAIR FOOT SUPPORT RETENTION ASSEMBLY AND METHOD

(76) Inventor: Gary W. Kern, Carlisle, PA (US)

( * ) Notice: Subject to any disclaimer, the term of this patent is extended or adjusted under 35 U.S.C. 154(b) by 0 days.

(21) Appl. No.: 13/314,979

(22) Filed: Dec. 8, 2011

(51) Int. Cl.
*A61G 5/10* (2006.01)
*B62B 9/12* (2006.01)

(52) U.S. Cl. .................................... 280/304.1; 280/647

(58) Field of Classification Search ............... 280/288.1, 280/304.1, 267, 250.1; 297/188.06, 423.1, 297/423.39, 423.4
See application file for complete search history.

(56) References Cited

U.S. PATENT DOCUMENTS

| | | | | |
|---|---|---|---|---|
| 2,868,275 | A * | 1/1959 | Mize | 297/423.4 |
| 3,848,922 | A | 11/1974 | Blanford | |
| 3,857,606 | A | 12/1974 | Rodaway | |
| 3,902,758 | A | 9/1975 | Pivacek | |
| 4,577,903 | A * | 3/1986 | Wells | 297/188.06 |
| 4,676,519 | A * | 6/1987 | Meier | 280/250.1 |
| 4,770,467 | A * | 9/1988 | Zinn | 297/423.37 |
| 4,805,931 | A * | 2/1989 | Slasor | 280/650 |
| 4,887,826 | A * | 12/1989 | Kantner | 280/250.1 |
| D315,027 | S | 2/1991 | Abbestam et al. | |
| 5,186,480 | A * | 2/1993 | Morgan et al. | 280/250.1 |
| 5,240,277 | A * | 8/1993 | Scheulderman | 280/650 |
| 5,522,644 | A | 6/1996 | Peek | |
| 5,794,957 | A * | 8/1998 | Mendon | 280/204 |
| 6,217,050 | B1 | 4/2001 | Dickie et al. | |
| 6,422,653 | B1 | 7/2002 | Szczepanski et al. | |
| 6,752,414 | B1 | 6/2004 | Waldron et al. | |
| 6,880,845 | B1 | 4/2005 | Broyles et al. | |
| 7,334,712 | B2 * | 2/2008 | Hassett et al. | 224/407 |
| 7,347,497 | B2 * | 3/2008 | Fujihara et al. | 297/423.29 |
| 7,370,660 | B2 * | 5/2008 | Hamilton et al. | 135/67 |
| 2007/0018426 | A1 * | 1/2007 | Willis | 280/304.1 |

FOREIGN PATENT DOCUMENTS

JP 2010227478 A * 10/2010

* cited by examiner

*Primary Examiner* — Lesley D Morris
*Assistant Examiner* — Daniel Yeagley

(57) ABSTRACT

A wheelchair foot support retention assembly and method are provided for preventing misplacement or loss of foot supports that may be removed from a wheelchair to facilitate a user entering or exiting the wheelchair. The assembly includes a wheelchair having a frame and a seat coupled to the frame. A receiver is coupled to the frame of the wheelchair and a foot support is detachably coupled to the receiver for selectively supporting a foot of a user seated on the seat of the wheelchair. A line is provided having a first end and a second end. The first end of the line is coupled to the frame of the wheelchair and the second end of the line is coupled to the foot support.

11 Claims, 6 Drawing Sheets

WHEELCHAIR FOOT SUPPORT RETENTION ASSEMBLY AND METHOD

BACKGROUND OF THE DISCLOSURE

Field of the Disclosure

The disclosure relates to wheelchair foot support retention devices and more particularly pertains to a new wheelchair foot support retention device for preventing misplacement or loss of foot supports that may be removed from a wheelchair to facilitate a user entering or exiting the wheelchair.

SUMMARY OF THE DISCLOSURE

An embodiment of the disclosure meets the needs presented above by generally comprising a wheelchair having a frame and a seat coupled to the frame. A receiver is coupled to the frame of the wheelchair and a foot support is detachably coupled to the receiver for selectively supporting a foot of a user seated on the seat of the wheelchair. A line is provided having a first end and a second end. The first end of the line is coupled to the frame of the wheelchair and the second end of the line is coupled to the foot support.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
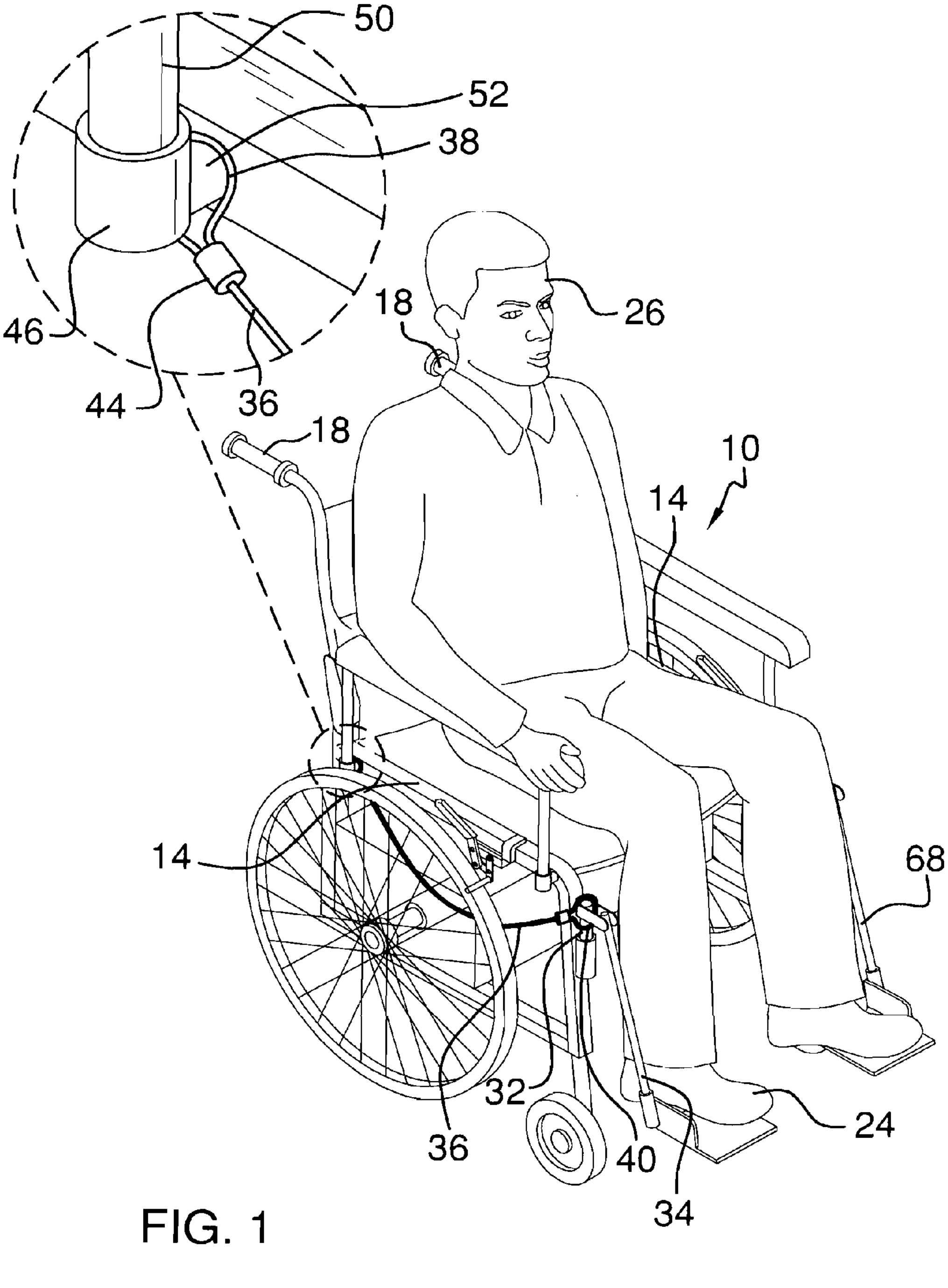
FIG. 1 is a top front side perspective view of a wheelchair foot support retention assembly according to an embodiment of the disclosure.
Figure 2:
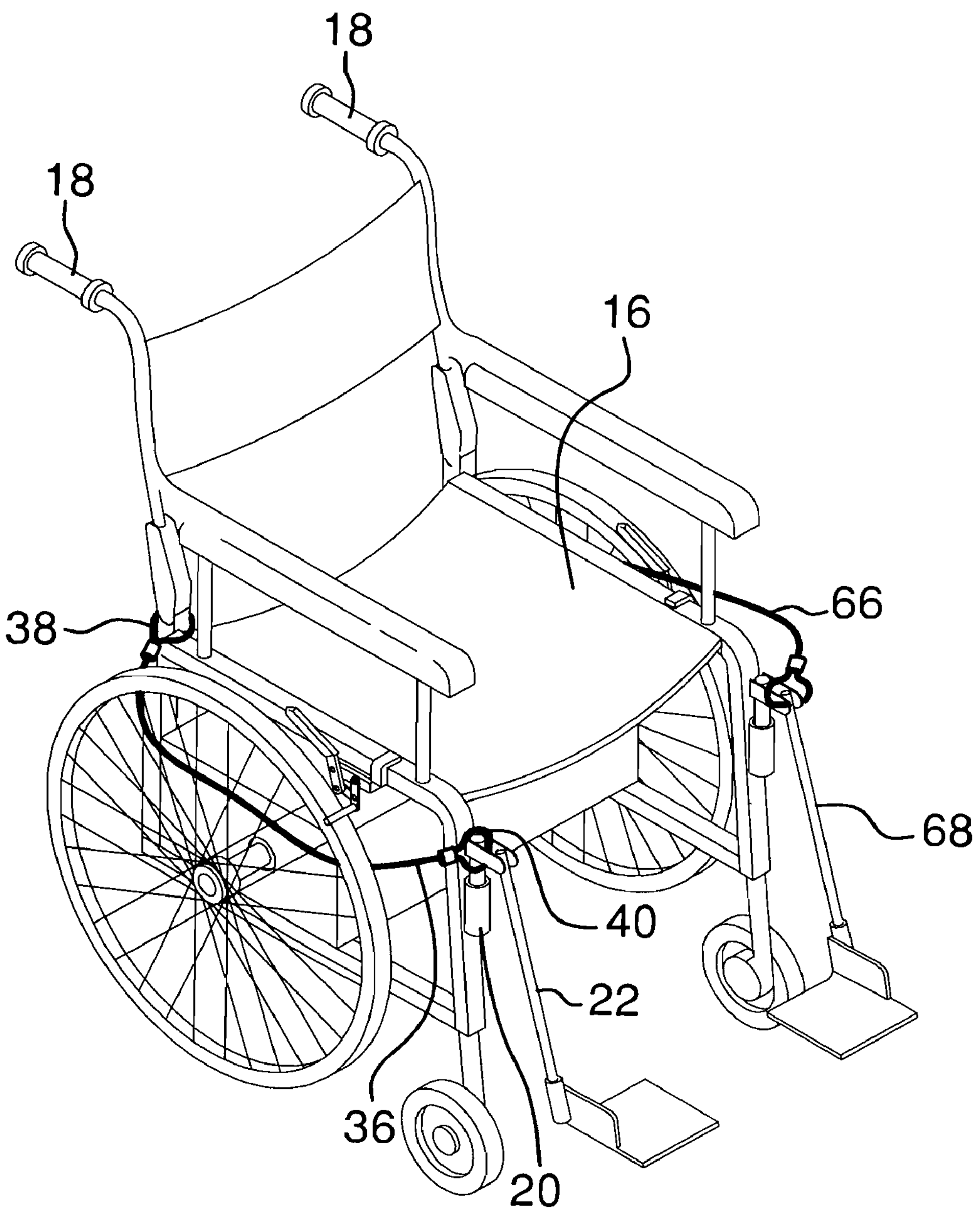
FIG. 2 is a top front side perspective view of an embodiment of the disclosure.
Figure 3:
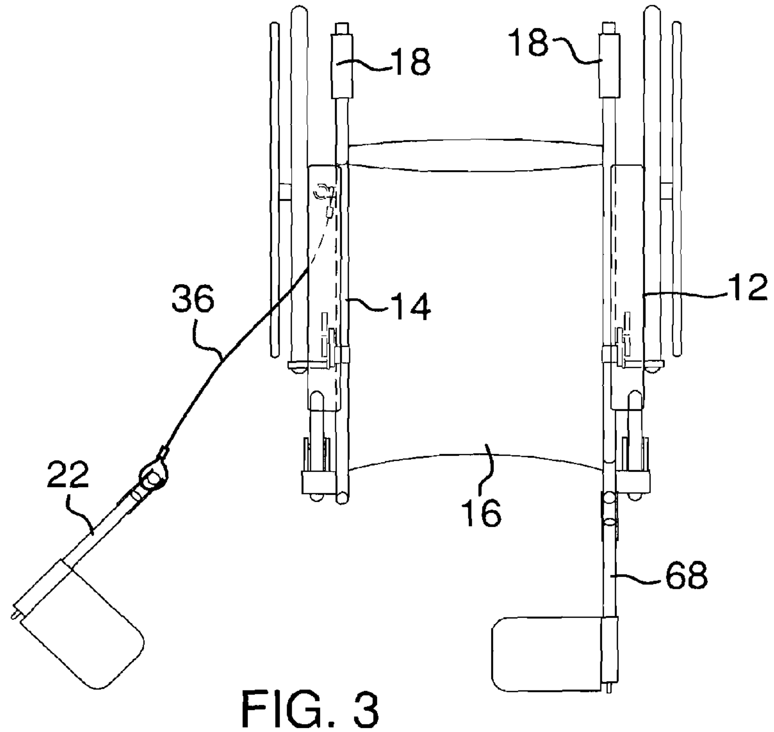
FIG. 3 is a top view of an embodiment of the disclosure.
Figure 4:
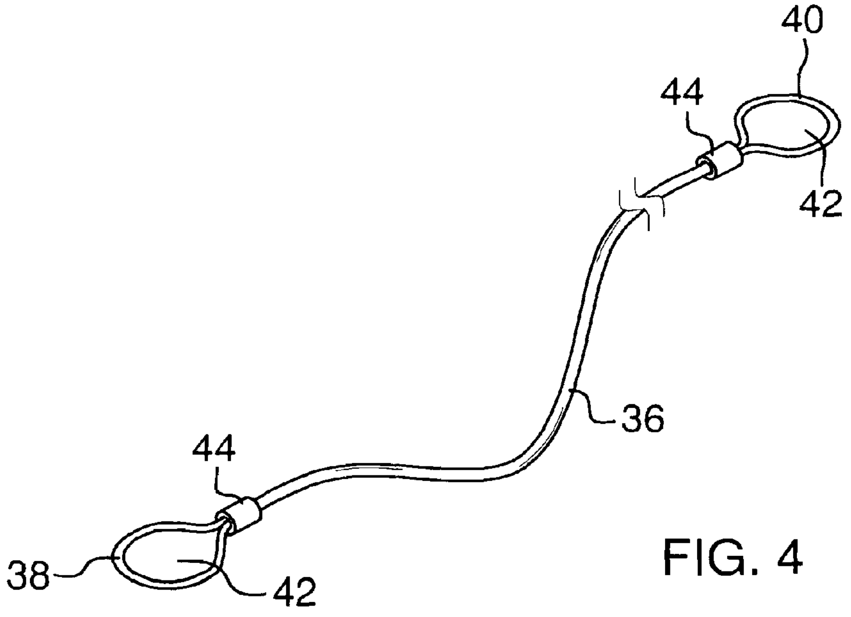
FIG. 4 is a top front side perspective view of an embodiment of the disclosure.
Figure 5:
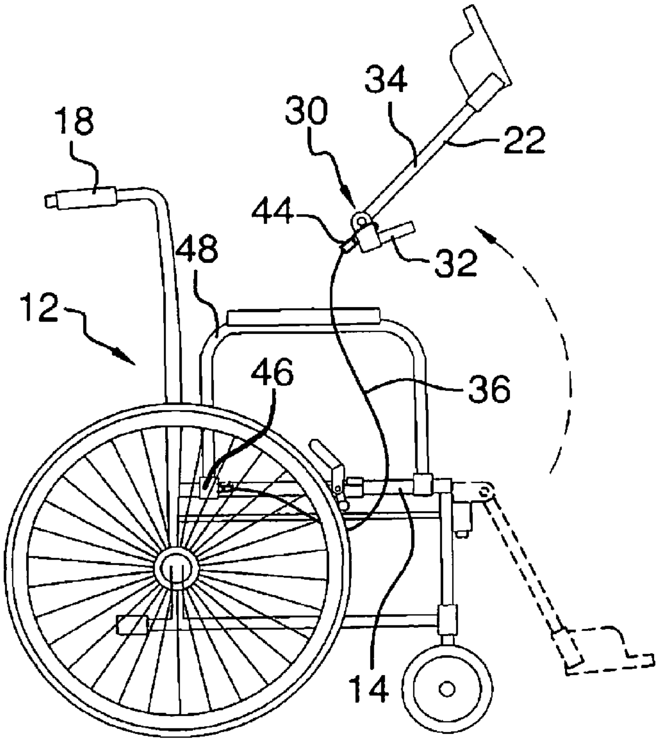
FIG. 5 is a side view of an embodiment of the disclosure.
Figure 6:
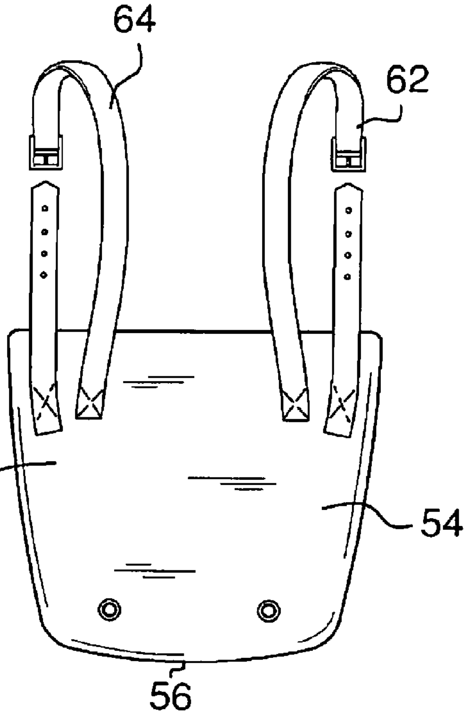
FIG. 6 is a front view of storage bag of an embodiment of the disclosure.
Figure 7:
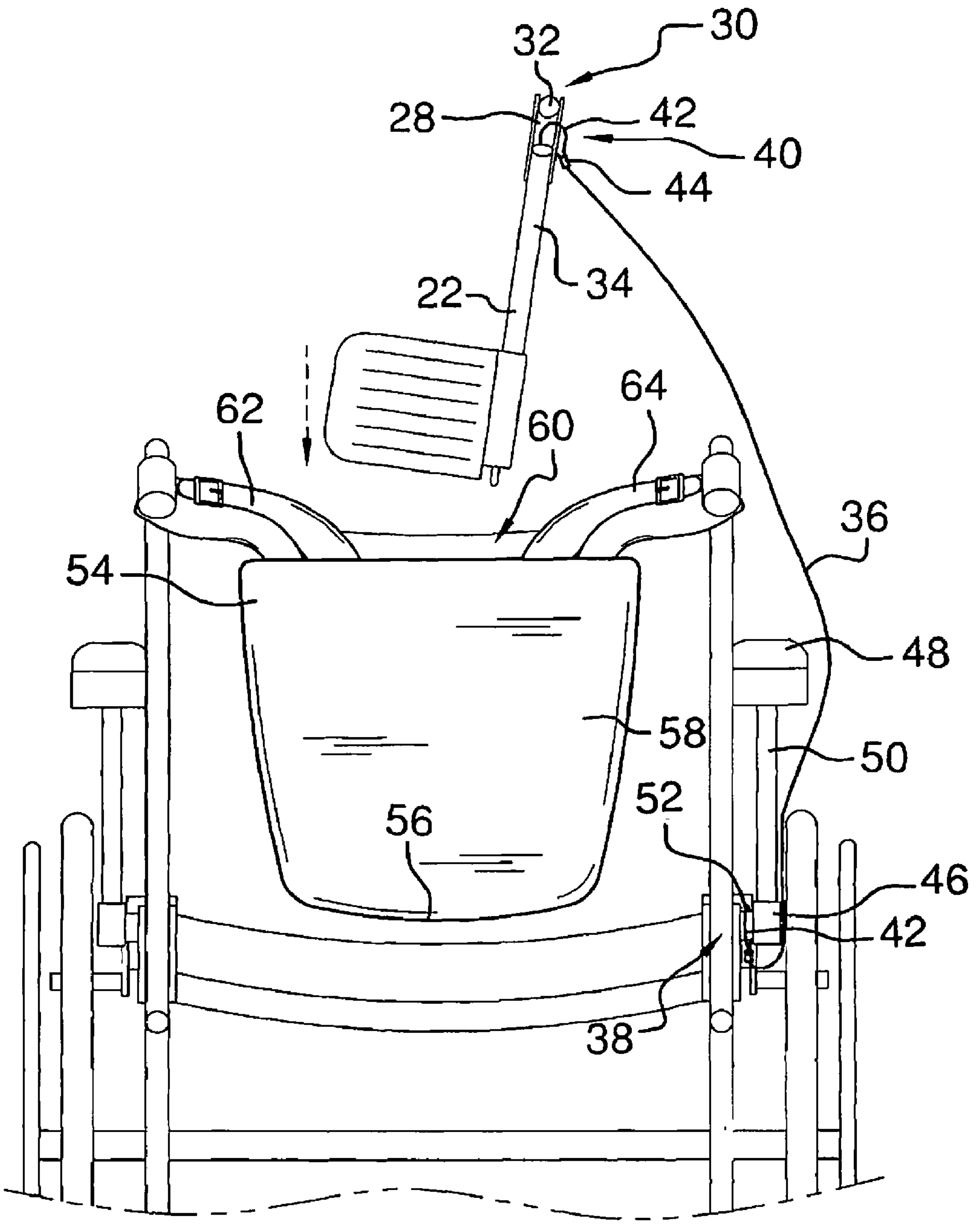
FIG. 7 is a rear view of an embodiment of the disclosure.
Figure 8:
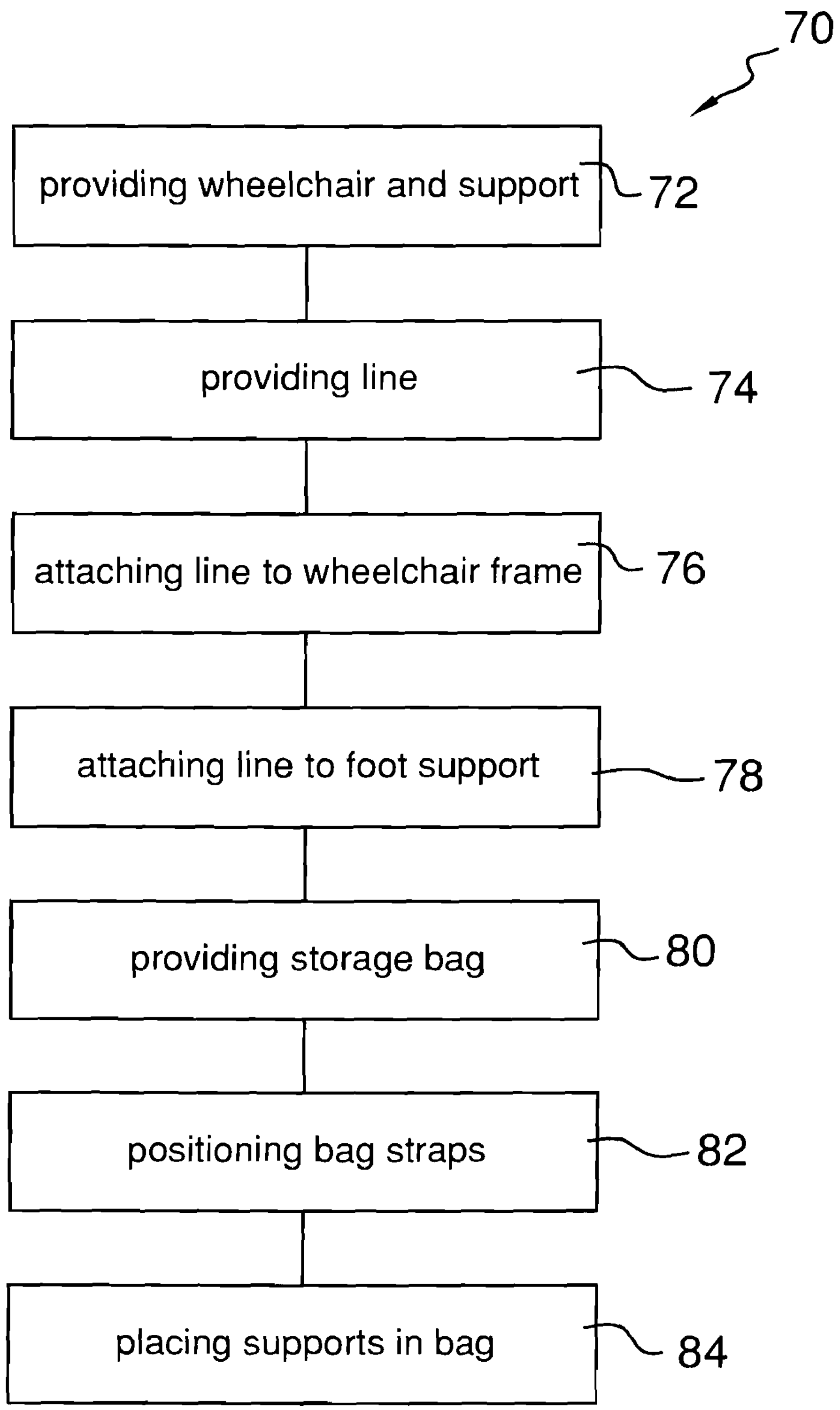
FIG. 8 is a schematic view of a method according to the disclosure.

With reference now to the drawings, and in particular to FIGS. 1 through 8 thereof, a new wheelchair foot support retention device embodying the principles and concepts of an embodiment of the disclosure and generally designated by the reference numeral 10 will be described.

As best illustrated in FIGS. 1 through 8, the wheelchair foot support retention assembly 10 generally comprises a wheelchair 12 having a frame 14 and a seat 16 coupled to the frame 14. The wheelchair 12 also has a pair of spaced handles 18. A receiver 20 is coupled to the frame 14 of the wheelchair 12. A foot support 22 detachably coupled to the receiver 20 such that the foot support 22 is configured for supporting a foot 24 of a user 26 seated on the seat 16 of the wheelchair 12. The foot support 22 may have a loop 28 formed at a junction 30 of an upper portion 32 of the foot support 22 and a lower portion 34 of the foot support 22. The upper portion 32 of the foot support 22 is pivotally coupled to the lower portion 34 of the foot support 22. A line 36 has a first end 38 and a second end 40. The line 36 may be constructed from a flexible cable, and may be comprised of metal, with the first end 38 and the second end 40 each being formed into a hoop 42 by a cable clamp 44. The first end 38 of the line 36 is coupled to the frame 14 and the second end 40 of the line 36 is coupled to the loop 28 coupling the second end 40 of the line 36 to the foot support 22.

The wheelchair 12 may include a rear socket 46 extending from the frame 14 of the wheelchair 12. A detachable arm support 48 has a rear post 50 inserted into the rear socket 46 to hold the arm support 48 in place. A connection member 52 may extend between the rear socket 46 and the frame 14. The first end 38 of the line 36 may be looped around the connection member 52 whereby the first end 38 of the line 36 is coupled to the frame 14.

A storage bag 54 may be provided. The storage bag 54 has a closed bottom 56 and a perimeter wall 58 extending up from the closed bottom 56 defining an interior space 60. The foot support 22 is positionable within the interior space 60 of the storage bag 54 when the foot support 22 is detached from the receiver 20. A first strap 62 is coupled to the storage bag 54 and may be used for coupling the storage bag 54 to the wheelchair 12. A second strap 64 may also be coupled to the storage bag 54 in the same general manner as a conventional backpack so that the first strap 62 and the second strap 64 may be coupled to the pair of handles 18 whereby the storage bag 54 is hung onto the handles 18 coupling the storage bag 54 to the wheelchair 12. The storage bag 54 is sized to accommodate two foot supports 22 as a second foot support 68 may be similarly attached by use of a second line 66.

A method 70 of preventing misplacement of the foot support 22 from the wheelchair 12 includes a first step 72 of providing the wheelchair 12 and the foot support 22 which is detachably coupled to the wheelchair 12. Another step 74 is providing the line 36 having the first end 38 and the second end 40. Attachment steps 76 and 78 include coupling the first end 38 of the line 36 to the frame 14 of the wheelchair 12 and coupling the second end 40 of the line 36 to the foot support 22, respectively. Thus, the foot support 22 is prevented from being moved beyond a pre-determined distance away from the wheelchair 12. The method 70 may further comprise a step 80 of providing the storage bag 54 having the first strap 62 and the second strap 64. A positioning step 82 is performed by positioning the first strap 62 and the second strap 64 over the pair of handles 18 coupling the storage bag 54 to the wheelchair 12. The method 70 may then include a step 84 of placing the foot support 22 into the storage bag 54 when the foot support 22 is detached from the receiver 20. The method 70 may be expanded for two foot supports 22,68 by repeating the applicable steps with the second foot support 68.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A wheelchair foot support retention assembly comprising:

a wheelchair having a frame and a seat coupled to said frame;

a receiver coupled to said frame of said wheelchair;

a foot support detachably coupled to said receiver such that said foot support is configured for supporting a foot of a user seated on said seat of said wheelchair;

a line having a first end and a second end, said first end of said line being coupled to said frame of said wheelchair, said second end of said line being coupled to said foot support;

a rear socket extending from said frame of said wheelchair; and an arm support having a rear post, said rear post being inserted into said rear socket;

a connection member extending between said rear socket and said frame; and said first end of said line being looped around said connection member whereby said first end of said line is coupled to said frame.

2. The assembly of claim 1, further including said foot support having a loop portion, said second end of said line being coupled to said loop portion of said foot support.

3. The assembly of claim 2, further including said loop portion being formed at a junction of an upper portion of said foot support and a lower portion of said foot support.

4. The assembly of claim 3, further including said upper portion of said foot support being pivotally coupled to said lower portion of said foot support.

5. The assembly of claim 1, further including a storage bag, said storage bag having a closed bottom and a perimeter wall extending up from said closed bottom defining an interior space, said foot support being positionable within said interior space of said storage bag.

6. The assembly of claim 5, further including a first strap coupled to said storage bag, said first strap coupling said storage bag to said wheelchair.

7. The assembly of claim 6, further comprising:

a second strap coupled to said storage bag;

said wheelchair having a pair of spaced handles, said first strap and said second strap being coupled to said pair of handles whereby said storage bag is coupled to said wheelchair.

8. The assembly of claim 1, further comprising:

said wheelchair having a back support extending between two upright posts of said frame; and said first end of said line being coupled to one of said upright posts of said frame.

9. A wheelchair foot support retention assembly comprising:

a wheelchair having a frame and a seat coupled to said frame, said wheelchair having a pair of spaced handles;

a receiver coupled to said frame of said wheelchair;

a foot support member detachably coupled to said receiver such that said foot support is configured for supporting a foot of a user seated on said seat of said wheelchair, said foot support having a loop portion, said loop portion being formed at a junction of an upper portion of said foot support and a lower portion of said foot support, said upper portion of said foot support being pivotally coupled to said lower portion of said foot support;

a rear socket extending from said frame of said wheelchair;

an arm support having a rear post, said rear post being inserted into said rear socket;

a connection member extending between said rear socket and said frame;

a line having a first end and a second end, said first end of said line being looped around said connection member whereby said first end of said line is coupled to said frame, said second end of said line being coupled to said loop portion whereby said second end of said line is coupled to said foot support, a storage bag, said storage bag having a closed bottom and a perimeter wall extending up from said closed bottom defining an interior space, said foot support being positionable within said interior space of said storage bag;

a first strap coupled to said storage bag, said first strap coupling said storage bag to said wheelchair; and a second strap coupled to said storage bag, said first strap and said second strap being coupled to said pair of handles whereby said storage bag is coupled to said wheelchair.

10. A method of preventing misplacement of a foot support for a wheelchair, the steps of the method comprising:

providing a wheelchair and a foot support detachably coupled to said wheelchair, said wheelchair having a frame, a seat, and a pair of spaced handles, said foot support being positioned in a receiver whereby said foot support is configured for supporting a foot of a user seated on said seat of said wheelchair, a rear socket extending from said frame of said wheelchair, an arm support having a rear post, said rear post being inserted into said rear socket, a connection member extending between said rear socket and said frame;

providing a line having a first end and a second end;

coupling said first end of said line to said frame of said wheelchair by looping said first end of said line around said connection member; and coupling said second end of said line to said foot support whereby said foot support is prevented from being moved beyond a pre-determined distance away from said wheelchair.

11. The method of claim 10, the steps of the method further comprising:

providing a storage bag having a first strap and a second strap;

positioning said first strap and said second strap over said pair of handles whereby said storage bag is coupled to said wheelchair; and placing said foot support into said storage bag when said foot support is detached from said receiver.

* * * * *